United States Patent [19]

Yamase et al.

[11] 4,102,983

[45] Jul. 25, 1978

[54] METHOD OF PURIFYING A GAS CONTAINING VOLATILE ORGANIC MATERIALS

[75] Inventors: Osamu Yamase, Kanagawa; Tetsuya Iida, Yokohama; Ichizo Hara, Hiratsuka, all of Japan

[73] Assignee: Showa Oil Co., Ltd., Tokyo, Japan

[21] Appl. No.: 723,480

[22] Filed: Sep. 15, 1976

[30] Foreign Application Priority Data

Sep. 19, 1975 [JP] Japan .................. 50-113285

[51] Int. Cl.² .............................................. B01D 53/34
[52] U.S. Cl. ...................................... 423/245; 55/64; 55/84; 55/88
[58] Field of Search ............... 423/210, 245; 55/64, 55/84, 88, 65

[56] References Cited

U.S. PATENT DOCUMENTS

| | | | |
|---|---|---|---|
| 1,996,088 | 4/1935 | Taylor | 55/64 |
| 2,580,622 | 1/1952 | Vogt et al. | 55/64 X |
| 2,623,611 | 12/1952 | Levine et al. | 55/64 |
| 2,666,742 | 1/1954 | Walker | 55/64 |

Primary Examiner—Earl C. Thomas
Attorney, Agent, or Firm—Stevens, Davis, Miller & Mosher

[57] ABSTRACT

By contacting a gas which contains vapors of volatile organic materials with an absorption liquid comprising a refined mineral oil and one or more compounds selected out of the group consisting of phthalic esters, silicic esters, phosphoric esters, carboxylic esters, alkyl benzenes, alkyl naphthalenes, and α-olefin oligomers, the volatile organic materials can be readily absorbed into the absorption liquid and thereafter effectively separated and recovered from the absorption liquid.

3 Claims, 1 Drawing Figure

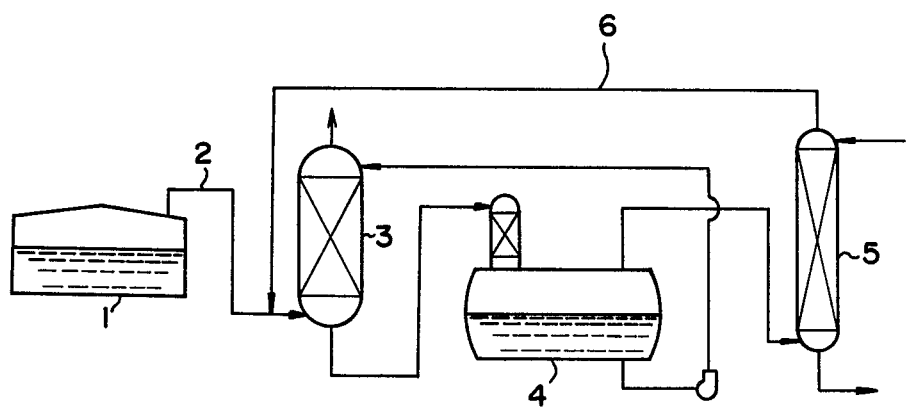

METHOD OF PURIFYING A GAS CONTAINING VOLATILE ORGANIC MATERIALS

BACKGROUND OF THE INVENTION

The present invention relates to a method of removing volatile organic materials from a gaseous mixture of air and vapors of volatile organic materials discharged to the atmosphere either from storage tanks or during the transportation of such materials, thereby purifying the discharged gas mixture.

When volatile organic materials such as low boiling petroleum products (e.g. gasoline, naphtha, and jet fuel), low boiling liquid hydrocarbons (e.g. aliphatics, naphthenics and aromatics), and also low boiling liquid alcohols, aldehydes, ketones, and chlorine-containing organic materials are stored, charged, or transported, gaseous mixtures are formed, which are allowed to be discharged into the atmosphere.

Various methods for removing and recovering the volatile organic materials have been proposed so far to meet strict regulations for the discharge of these gaseous mixtures.

SUMMARY OF THE INVENTION

The primary object of this invention is to remove the volatile organic materials simply and effectively from such gaseous mixtures.

Another object of this invention is to recover the removed and separated volatile organic materials in high purity and in high yield by utilizing in recycle the absorption liquid which has absorbed the volatile organic materials.

Further, the above objects are accomplished by the present invention with the employment of an absorption liquid prepared by blending a mineral oil of an average molecular weight of 200 to 350 with the above-mentioned compounds in the range of 0.1 to 75% by weight of said absorption liquid. In this invention, there is provided a method of purifying gas having high absorption and separation efficiencies.

It is known that in a method of purifying gas by use of an absorption liquid having excellent efficiency in the absorption of volatile organic materials is insufficient in separating the same, and that, on the other hand, an absorption liquid having low efficiency in the absorption of volatile organic materials is superior in separation ability for the same.

The inventors have made efforts to develop an absorption liquid having excellent capability of both absorbing and separating volatile organic materials and have succeeded in providing an excellent purification method by utilizing an absorption liquid according to the present invention.

It is desired that the absorption liquid used in this method is of a high dissolving capacity for volatile organic materials, and is insoluble in water, with its kinematic viscosity if not more than 100 centistokes (symbol) cSt. at room temperature and its boiling point of not less than 250° C at normal pressure and its freezing point of not more than −30° C.

As constituents of the absorption liquid satisfying the above requirements, there are; phthalic esters such as methyl-ethyl phthalate, diisodecyl phthalate diisodecyl phthalate, diethyl phthalate, dioctyl phthalate, didecyl phthalate, dibutyl phthalate, dimethyl phthalate, dilauryl phthalate, decyl-isooctyl phthalate, butylbenzyl phthalate, and butyl-lauryl phthalate; silicic esters such as tetraoctyl silicate and tetrannonyl silicate; and phosphoric esters such as trioctyl phosphate, tricresyl phosphate, tributyl phosphate, tributoxyethyl phosphate, trixylenyl phosphate, tricresyl-diphenyl phosphate, and octyl-diphenyl phosphate.

In addition to the above-mentioned compounds, carboxylic esters such as dioctyl adipate, dibutyl adipate, dioctyl azelate, dibutyl sebacate, dioctyl sebacate, and butyl oleate, alkyl benzenes such as n-dodecyl benzene, and isododecyl benzene, and α-olefin oligomers having an average molecular weight of 300 to 400 and a kinematic of 10 to 20 cSt. at 37.8° C may be used.

The absorption liquid employed in this invention is prepared by blending with the aforesaid various compounds a refined mineral oil having an average molecular weight of 200 to 350, a kinematic viscosity of 5 to 20 cSt. at 37.8° C, and a boiling range of 250° to 450° C under normal pressure in the range of 0.1 to 75% by weight of said absorption liquid. This blending ratio may be optionally varied depending on the component with which the refined mineral oil is blended, but the content of more than 75% by weight of the refined mineral oil in said absorption liquid makes it difficult to obtain high absorption and separation efficiencies at which the present invention aims.

The reason why the viscosity of the absorption liquid used in this invention is limited is that too high viscosity of the absorption liquid causes not only a noticeable decrease in absorption efficiency and large pressure drop in an absorption tower, but also a flooding when the absorption liquid is contacted with gas in counterflow in the tower, and exerts an adverse effect on the power consumed in the handling of the absorption liquid. On the other hand, too low viscosity means low molecular weight, thus high vapor pressure, and causes the absorption liquid to form an azeotropic mixture with the volatile organic materials separated from the absorption liquid in a separator and mix into the volatile organic materials to be recovered, leading to a decrease in the purity of recovered volatile organic compounds. Further, if the molecular weight of the absorption liquid is too low, the solubility of the volatile organic materials decreases greatly.

BRIEF DESCRIPTION OF THE DRAWING

FIG. 1 is a schematic diagram illustrating an embodiment of the process used to execute the method in accordance with the present invention.

Description of this embodiments is made in the attached drawing, a gasoline tank 1 is equipped with an exhaust gas pipe 2, gas mixture being discharged from the exhaust gas pipe at the time of temperature rise or gasoline charge. The gas discharged from the exhaust gas pipe 2 in introduced into an absorption tower 3. The interior of said absorption tower 3 is filled with packings such as Raschig-rings, into which said gas mixture is introduced at the bottom and the absorption liquid is flushed from the top of the tower to be contacted with said gas mixture in a counter current flow. The contact ratio of said absorption liquid and said gas in the absorption tower is in the range of 5 to 300 (kgs absorption liquid/m$^3$gas). The air which has had the volatile organic compounds removed is discharged from the top of the absorption tower 3 to the atmosphere through a flame arrestor (not shown). The amount of the volatile organic materials contained in the discharged air is so small that it does not contribute to photochemical smog.

The operation in the absorption tower 3 is ordinarily performed at atmospheric temperature and under atmospheric pressure, but it may also be carried out under pressure or under pressurized and cooled conditions, and further the gas mixture may be absorbed after it is subjected to pretreatment of pressurization and cooling as the case may be.

The absorption liquid which has absorbed the volatile organic materials in the absorption tower 3 is taken out of the bottom of absorption tower 3 and introduced into a separator 4, where the volatile organic materials are separated by evaporation. The absorption liquid which has had the volatile organic materials therein separated is taken out of the bottom of separator 4 and sent to the top of absorption tower 3 by a pump, thus being utilized in recycle. The volatile organic materials separated by evaporation in the separator 4 are further sent to a gasoline absorption tower 5, where they are condensed and absorbed. The gasoline in the bottom of gasoline absorption tower 5 is sent back to a gasoline storage tank, and the vapor not condensed in the gasoline absorption tower 5 is recirculated through a pipe 6 to the absorption tower 3 and removed.

It will be understood to those skilled in the art that the method in accordance with the present invention is not limited to the above-mentioned embodiment and such modifications as follows are possible without departing from the spirit and the scope of the invention. The shape of the packings packed in the absorption tower may differ from that of Raschig-ring; the structure of the absorption tower is not necessarily limited to a packed tower and a plate column or the like may be used as far as it permits a good contact effect between the gas and liquid; a distillation tower may substitute for the separator, stripping process by using an inert gas such as nitrogen may be applied in order to separate the volatile organic materials more efficiently in the separator; and a condenser may be used instead of the gasoline absorption tower.

The method according to this invention being that of absorbing gas mixtures into an absorption liquid as described above, there is no danger of explosion. According to this method, it is possible to improve separation rate without decreasing absorption efficiency of the volatile organic materials into the absorption liquid, to enhance purity and recovery rate of the volatile organic materials, and to purify the gas mixture economically almost without any loss in the absorption liquid in absorption and separation processes, because the separation of the volatile organic materials from the absorption liquid is easy and there is no anxiety of azeotropy as is the case of using kerosene or gas oil.

In addition to those features mentioned above the method of this invention has the advantage that, since well-known means are available, this method requires no special equipment to conduct the same.

Examples 1 to 9 of the method according to the invention are indicated below, wherein a gas mixture containing volatile organic materials was absorbed by various absorption liquids at 35° C in an absorption tower filled with Raschig-rings.

On the other hand, into 200g of various absorption liquids were dissolved 1 to 5% by weight of the volatile organic materials, solutions were placed in air-tight containers, maintained at the prescribed temperature and reduced pressure under agitation and sucked for 4 minutes, and thereafter the amounts of the organic materials separated (the loss in the amounts of the solutions) were determined.

EXAMPLE 1

Absorption and separation of n-pentane (n-C5) by tetranonyl silicate/refined mineral oil system

ABSORPTION

|  | n-C5 content in inlet absorption liquid (wt.%) | Flow rate of inlet absorption liquid (g/min) | N-C5 content in inlet gas (mol%) | Flow rate of inlet gas (l/min) | n-C5 content in outlet gas (mol%) | Flow rate of outlet gas (l/min) | Absorption rate (%) |
|---|---|---|---|---|---|---|---|
| Tetranonyl silicate | 0.0 | 117 | 26.5 | 0.98 | 1.23 | 0.73 | 96.6 |
|  | 1.5 | 121 | 26.5 | 0.90 | 3.19 | 0.68 | 90.8 |
| Tetranonyl silicate 50vol% Refined mineral oil 50vol% | 0.0 | 136 | 29.2 | 0.99 | 1.55 | 0.71 | 96.2 |
|  | 1.5 | 139 | 29.2 | 0.94 | 3.47 | 0.69 | 91.3 |
|  | 3.0 | 137 | 29.2 | 0.94 | 5.83 | 0.71 | 85.0 |
| Tetranonyl silicate 25vol% Refined mineral oil 75vol% | 0.0 | 137 | 29.2 | 0.99 | 1.31 | 0.71 | 96.8 |
|  | 1.5 | 134 | 29.2 | 0.99 | 3.39 | 0.73 | 91.5 |
|  | 3.0 | 138 | 29.2 | 0.92 | 5.76 | 0.69 | 85.2 |
| Refined mineral oil | 0.0 | 134 | 29.2 | 0.99 | 1.34 | 0.71 | 96.7 |
|  | 1.5 | 134 | 29.2 | 0.94 | 3.35 | 0.69 | 91.6 |
|  | 3.0 | 134 | 29.2 | 0.96 | 5.72 | 0.72 | 85.3 |

SEPARATION pressure 50mmHg
temperature 35° C
time 4 min.

|  | n-C5 content in absorption liquid (wt.%) | Separated n-C5 vs absorption liquid (wt.%) | Separation rate (%) |
|---|---|---|---|
| Tetranonyl silicate | 1 | 0.29 | 29.0 |
|  | 2 | 0.54 | 27.0 |
|  | 3 | 0.97 | 32.3 |
| Tetranonyl silicate 50vol% Refined mineral oil | 1 | 0.33 | 33.0 |
|  | 2 | 0.62 | 31.0 |

EXAMPLE 1-continued

Absorption and separation of n-pentane (n-C5) by tetranonyl silicate/refined mineral oil system

| | | | |
|---|---|---|---|
| 50vol% | 3 | 1.07 | 35.7 |
| Tetranonyl silicate | 1 | 0.36 | 36.0 |
| 25vol% | 2 | 0.65 | 32.5 |
| Refined mineral oil | | | |
| 75vol% | 3 | 1.02 | 34.0 |
| Refined mineral oil | 1 | 0.25 | 25.0 |
| | 2 | 0.45 | 22.5 |
| | 3 | 0.83 | 27.7 |

EXAMPLE 2

Absorption and separation of n-pentane (n-C5) by alkyl benzene/refined mineral oil system

ABSORPTION

| | n-C5 content in inlet absorption liquid (wt.%) | Flow rate of inlet absorption liquid (g/min) | n-C5 content in inlet gas (mol%) | Flow rate of inlet gas (l/min) | n-C5 content in outlet gas (mol%) | Flow rate of outlet gas (l/min) | Absorption rate (%) |
|---|---|---|---|---|---|---|---|
| | 0.0 | 131.1 | 26.5 | 0.95 | 0.47 | 0.70 | 98.7 |
| Alkylbenzene | 1.5 | 131.1 | 26.5 | 0.95 | 2.62 | 0.72 | 92.5 |
| | 3.0 | 136.3 | 26.5 | 0.86 | 4.74 | 0.66 | 86.2 |
| Alkyl benzene 50vol% | 0.0 | 134 | 29.2 | 0.99 | 0.82 | 0.71 | 98.0 |
| Refined mineral oil 50vol% | 1.5 | 130 | 29.2 | 0.93 | 3.12 | 0.68 | 92.2 |
| | 3.0 | 134 | 29.2 | 1.02 | 5.53 | 0.76 | 85.8 |
| | 0.0 | 134 | 29.2 | 0.99 | 1.34 | 0.71 | 96.7 |
| Refined Mineral oil | 1.5 | 134 | 29.2 | 0.94 | 3.35 | 0.69 | 91.6 |
| | 3.0 | 134 | 29.2 | 0.96 | 5.72 | 0.72 | 85.3 |

SEPARATION pressure 50 mmHg
temperature 35° C
time 4 min.

| | n-C5 content in absorption liquid (wt.%) | Separated n-C5 vs absorption liquid (wt.%) | Separation rate (%) |
|---|---|---|---|
| Alkyl benzene | 2 | 0.41 | 20.5 |
| | 3 | 0.72 | 24.0 |
| | 4 | 1.19 | 29.8 |
| Alkyl benzene 50vol% Refined mineral oil 50vol% | 2 | 0.44 | 22.0 |
| | 3 | 0.83 | 27.7 |
| | 4 | 1.26 | 31.5 |
| Refined mineral oil | 2 | 0.45 | 22.5 |
| | 3 | 0.83 | 27.7 |
| | 4 | 1.24 | 31.0 |

EXAMPLE 3

Absorption and separation of n-pentane (n-C5) by dioctyl adipate/refined mineral oil system

ABSORPTION

| | n-C5 content in inlet absorption liquid (wt.%) | Flow rate of inlet absorption liquid (g/min) | n-C5 content in inlet gas (mol%) | Flow rate of inlet gas (l/min) | n-C5 content in outlet gas (mol%) | Flow rate of outlet gas (l/min) | Absorption rate (%) |
|---|---|---|---|---|---|---|---|
| Dioctyl adipate | 0.0 | 142 | 26.1 | 0.96 | 1.77 | 0.72 | 95.0 |
| | 1.5 | 142 | 26.5 | 0.88 | 4.47 | 0.67 | 87.0 |
| Dioctyl adipate 50vol% Refined Mineral oil 50vol% | 0.0 | 137 | 29.2 | 0.97 | 1.62 | 0.70 | 96.0 |
| | 1.5 | 137 | 29.2 | 1.01 | 3.31 | 0.74 | 91.7 |
| | 3.0 | 137 | 29.2 | 0.94 | 5.94 | 0.71 | 84.7 |
| Refined mineral oil | 0.0 | 134 | 29.2 | 0.99 | 1.34 | 0.71 | 96.7 |
| | 1.5 | 134 | 29.2 | 0.94 | 3.35 | 0.69 | 91.6 |
| | 3.0 | 134 | 29.2 | 0.96 | 5.72 | 0.72 | 85.3 |

SEPARATION pressure 50mmHg
temperature 35° C
time 4 min.

| n-C5 content in absorption liquid | Separated n-C5 vs absorption liquid | Separation rate |
|---|---|---|

EXAMPLE 3-continued

Absorption and separation of n-pentane (n-C5) by dioctyl adipate/refined mineral oil system

|  | (wt.%) | (wt.%) | (%) |
|---|---|---|---|
| Dioctyl adipate | 1 | 0.34 | 34.0 |
|  | 2 | 0.65 | 32.5 |
|  | 3 | 1.06 | 35.3 |
| Dioctyl adipate 50vol% | 1 | 0.31 | 31.0 |
|  | 2 | 0.59 | 29.5 |
| Refined mineral oil 50vol% | 3 | 1.00 | 33.3 |
| Refined mineral oil | 1 | 0.25 | 25.0 |
|  | 2 | 0.45 | 22.5 |
|  | 3 | 0.83 | 27.7 |

EXAMPLE 4

Absorption and separation of benzene by tetranonyl silicate/refined mineral oil system

ABSORPTION

|  | Benzene content in inlet absorption liquid (wt.%) | Flow rate of inlet absorption liquid (g/min) | Benzene content in inlet gas (mol%) | Flow rate of inlet gas (l/min) | Benzene content in outlet gas (mol%) | Flow rate of outlet gas (l/min) | Absorption rate (%) |
|---|---|---|---|---|---|---|---|
| Tetranonyl silicate | 0.0 | 89.1 | 10.85 | 3.5 | 0.83 | 3.11 | 93.1 |
|  | 1.5 | 87.4 | 10.85 | 3.4 | 1.59 | 3.06 | 86.7 |
|  | 3.0 | 90.9 | 10.85 | 3.4 | 2.23 | 3.14 | 81.3 |
| Tetranonyl silicate 50vol% | 0.0 | 88.8 | 9.59 | 3.32 | 0.63 | 3.02 | 94.0 |
|  | 1.5 | 88.8 | 9.59 | 3.33 | 1.03 | 3.04 | 90.2 |
| Refined mineral oil 50vol% | 3.0 | 88.8 | 9.59 | 3.33 | 1.59 | 3.06 | 84.8 |
|  | 0.0 | 86.7 | 9.59 | 3.35 | 0.67 | 3.05 | 93.7 |
| Refined mineral oil | 1.5 | 86.7 | 9.59 | 3.33 | 0.91 | 3.04 | 91.3 |
|  | 3.0 | 86.7 | 9.59 | 3.35 | 1.52 | 3.08 | 85.5 |

SEPARATION pressure 50mmHg
temperature 80° C
time 4 min.

|  | Benzene content in absorption liquid (wt.%) | Separated benzene vs absorption liquid (wt.%) | Separation rate (%) |
|---|---|---|---|
| Tetranonyl silicate | 3 | 0.38 | 12.7 |
|  | 4 | 0.74 | 18.5 |
|  | 5 | 1.48 | 29.6 |
| Tetranonyl silicate 50vol% Refined mineral oil 50vol% | 3 | 0.46 | 15.3 |
|  | 4 | 0.88 | 22.0 |
|  | 5 | 1.52 | 30.4 |
| Refined mineral oil | 3 | 0.35 | 11.7 |
|  | 4 | 0.70 | 17.5 |
|  | 5 | 1.48 | 29.6 |

EXAMPLE 5

Absorption and separation of benzene by dioctyl adipate/tetranonyl silicate/refined mineral oil system

ABSORPTION

|  | Benzene content in inlet absorption liquid (wt.%) | Flow rate of inlet absorption liquid (g/min) | Benzene content in inlet gas (mol%) | Flow rate of inlet gas (l/min) | Benzene content in outlet gas (mol%) | Flow rate of outlet gas (l/min) | Absorption rate (%) |
|---|---|---|---|---|---|---|---|
| Dioctyl adipate | 0.0 | 88.3 | 9.59 | 3.33 | 0.19 | 3.02 | 98.2 |
|  | 1.5 | 88.3 | 9.59 | 3.41 | 0.58 | 3.10 | 94.5 |
|  | 3.0 | 88.3 | 9.59 | 3.35 | 0.77 | 3.05 | 92.7 |
| Tetranonyl silicate | 0.0 | 89.1 | 10.85 | 3.5 | 0.83 | 3.11 | 93.1 |
|  | 1.5 | 87.4 | 10.85 | 3.4 | 1.59 | 3.06 | 86.7 |
|  | 3.0 | 90.9 | 10.85 | 3.4 | 2.23 | 3.14 | 81.3 |
| Dioctyl adipate 33.3vol% Tetranonyl silicate 33.3vol% Refined mineral oil 33.4vol% | 0.0 | 87.1 | 9.59 | 3.37 | 0.29 | 3.06 | 97.2 |
|  | 1.5 | 87.1 | 9.59 | 3.32 | 0.81 | 3.03 | 92.3 |
|  | 3.0 | 87.1 | 9.59 | 3.37 | 0.99 | 3.08 | 90.6 |
|  | 0.0 | 86.7 | 9.59 | 3.35 | 0.67 | 3.05 | 93.7 |

EXAMPLE 5-continued

Absorption and separation of benzene by dioctyl adipate/tetranonyl silicate/refined mineral oil system

| | | | | | | | |
|---|---|---|---|---|---|---|---|
| Refined | 1.5 | 86.7 | 9.59 | 3.33 | 0.91 | 3.04 | 91.3 |
| mineral oil | 3.0 | 86.7 | 9.59 | 3.35 | 1.52 | 3.08 | 85.5 |

SEPARATION
- pressure: 50mmHg
- temperature: 30° C
- time: 4 min.

| | Benzene content in absorption liquid (wt.%) | Separated benzene vs absorption liquid (wt.%) | Separation rate (%) |
|---|---|---|---|
| Dioctyl adipate | 3 | 0.20 | 6.7 |
| | 4 | 0.44 | 11.0 |
| | 5 | 0.96 | 19.2 |
| Tetranonyl silicate | 3 | 0.38 | 12.7 |
| | 4 | 0.74 | 18.5 |
| | 5 | 1.48 | 29.6 |
| Dioctyl adipate 33.3vol% Tetranonyl silicate 33.3vol% Refined mineral oil 33.4vol% | 3 | 0.30 | 10.0 |
| | 4 | 0.63 | 15.8 |
| | 5 | 1.29 | 25.8 |
| Refined mineral oil | 3 | 0.35 | 11.7 |
| | 4 | 0.70 | 17.5 |
| | 5 | 1.48 | 29.6 |

EXAMPLE 6

Absorption and separation of cyclohexane (CH) by alkyl naphthalene/refined mineral oil system

ABSORPTION

| | CH content in inlet absorption liquid (wt%) | Flow rate of inlet absorption liquid (g/min) | CH content in inlet gas (mol%) | Flow rate of inlet gas (l/min) | CH content in outlet gas (mol%) | Flow rate of outlet gas (l/min) | Absorption rate (%) |
|---|---|---|---|---|---|---|---|
| Alkyl naphthalene | 0 | 148 | 15.2 | 3.99 | 1.81 | 3.45 | 89.7 |
| | 2 | 148 | 15.2 | 3.92 | 1.91 | 3.39 | 89.1 |
| | 4 | 148 | 15.2 | 3.98 | 2.11 | 3.45 | 88.0 |
| Alkyl naphthalene 25vol% Refined mineral oil 75vol% | 0 | 148 | 15.2 | 4.01 | 0.68 | 3.42 | 96.2 |
| | 2 | 148 | 15.2 | 3.96 | 0.96 | 3.39 | 94.6 |
| | 4 | 148 | 15.2 | 3.93 | 1.47 | 3.38 | 91.7 |
| Refined mineral oil | 0 | 148 | 15.2 | 3.90 | 0.51 | 3.32 | 97.9 |
| | 2 | 148 | 15.2 | 3.96 | 0.87 | 3.39 | 95.1 |
| | 4 | 148 | 15.2 | 3.92 | 1.36 | 3.37 | 92.8 |

SEPARATION
- pressure: 20mmHg
- temperature: 50° C
- time: 4 min.

| | CH content in absorption liquid (wt.%) | Separated CH vs absorption liquid (wt.%) | Separation rate (%) |
|---|---|---|---|
| Alkyl naphthalene | 2 | 0.36 | 18.0 |
| | 3 | 0.68 | 22.7 |
| | 4 | 1.11 | 27.8 |
| Alkyl naphthalene 25vol% Refined mineral oil 75vol% | 2 | 0.23 | 11.5 |
| | 3 | 0.53 | 17.7 |
| | 4 | 0.95 | 23.8 |
| Refined mineral oil | 2 | 0.13 | 6.5 |
| | 3 | 0.41 | 13.7 |
| | 4 | 0.85 | 21.2 |

EXAMPLE 7

Absorption and separation of methanol by trioctyl phosphate/refined mineral oil system

ABSORPTION

| | Methanol content in inlet absorption liquid (wt.%) | Flow rate of inlet absorption liquid (g/min) | Methanol content in inlet gas (mol%) | Flow rate of inlet gas (/min) | Methanol content in outlet gas (mol%) | Flow rate of outlet gas (/min) | Absorption rate (%) |
|---|---|---|---|---|---|---|---|
| Trioctyl | 0.0 | 124 | 19.7 | 1.25 | 1.42 | 1.02 | 94.1 |
| | 1.5 | 127 | 19.7 | 1.22 | 3.38 | 1.01 | 86.1 |

EXAMPLE 7-continued

Absorption and separation of methanol by trioctyl phosphate/refined mineral oil system

|  |  |  |  |  |  |  |  |
|---|---|---|---|---|---|---|---|
| phosphate | 3.0 | 122 | 19.7 | 1.26 | 5.09 | 1.07 | 78.1 |
| Trioctyl phosphate 50vol% | 0.0 | 130 | 19.7 | 1.20 | 1.61 | 0.98 | 93.3 |
|  | 1.5 | 130 | 19.7 | 1.23 | 3.48 | 1.02 | 85.3 |
| Refined mineral oil 50vol% | 3.0 | 130 | 19.7 | 1.23 | 5.23 | 1.04 | 77.5 |
|  | 0.0 | 133 | 19.7 | 1.25 | 2.47 | 1.03 | 89.7 |
| Refined mineral oil | 1.5 | 133 | 19.7 | 1.22 | 4.19 | 1.02 | 82.2 |
|  | 3.0 | 133 | 19.7 | 1.27 | 6.47 | 1.09 | 71.8 |

SEPARATION
pressure 50mmHg
temperature 35° C
time 4 min.

|  | Methanol content in absorption liquid (wt.%) | Separated methanol vs absorption liquid (wt.%) | Separation rate (%) |
|---|---|---|---|
| Trioctyl phosphate | 1 | 0.42 | 42.0 |
|  | 2 | 0.88 | 44.0 |
|  | 3 | 1.53 | 51.0 |
| Trioctyl phosphate 50vol% | 1 | 0.54 | 54.0 |
|  | 2 | 1.15 | 57.5 |
| Refined mineral oil 50vol% | 3 | 1.90 | 63.3 |
|  | 1 | 0.57 | 57.0 |
| Refined mineral oil | 2 | 1.28 | 64.0 |
|  | 3 | 2.11 | 70.3 |

EXAMPLe 8

Absorption and separation of methylethylketone (MEK) by polyolefin/mineral oil system
ABSORPTION

|  | MEK content in inlet absorption liquid (wt.%) | Flow rate of inlet absorption liquid (g/min) | MEK content in inlet gas (mol%) | Flow rate of inlet gas (l/min) | MEK content in outlet gas (mol%) | Flow rate of outlet gas (l/min) | Absorption rate (%) |
|---|---|---|---|---|---|---|---|
|  | 0.0 | 128 | 12.2 | 1.22 | 0.77 | 1.08 | 94.4 |
| Polyolefin | 1.5 | 126 | 12.2 | 1.22 | 1.54 | 1.09 | 88.7 |
|  | 3.0 | 125 | 12.2 | 1.23 | 2.28 | 1.11 | 83.2 |
| Polyolefin 50vol% | 0.0 | 131 | 12.2 | 1.26 | 0.74 | 1.11 | 94.6 |
|  | 1.5 | 133 | 12.2 | 1.21 | 1.49 | 1.08 | 89.1 |
| Refined mineral oil 50vol% | 3.0 | 130 | 12.2 | 1.23 | 2.04 | 1.10 | 85.0 |
|  | 0.0 | 136 | 12.2 | 1.22 | 0.66 | 1.08 | 95.2 |
| Refined mineral oil | 1.5 | 136 | 12.2 | 1.24 | 1.50 | 1.11 | 89.0 |
|  | 3.0 | 136 | 12.2 | 1.22 | 1.96 | 1.09 | 85.6 |

SEPARATION
pressure 50mmHg
temperature 80° C
time 4 min.

|  | MEK content in absorption liquid (wt.%) | Separated MEK vs absorption liquid (wt.%) | Separation rate (%) |
|---|---|---|---|
|  | 3 | 0.21 | 7.0 |
| polyolefin | 4 | 0.65 | 16.3 |
|  | 5 | 1.28 | 25.6 |
| Polyolefin 50vol% | 3 | 0.19 | 6.3 |
|  | 4 | 0.59 | 14.8 |
| Refined mineral oil 50vol% | 5 | 1.19 | 23.8 |
|  | 3 | 0.16 | 5.3 |
| Refined mineral oil | 4 | 0.50 | 12.5 |
|  | 5 | 1.02 | 20.4 |

EXAMPLE 8

Absorption and separation of 1.2-di-chloroethane (EDC) by dibutyl phthalate/refined mineral oil system
ABSORPTION

|  | EDC content in inlet absorption liquid (wt.%) | Flow rate of inlet absorption liquid (g/min) | EDC content in inlet gas (mol%) | Flow rate of inlet gas (l/min) | EDC content in outlet gas (mol%) | Flow rate of outlet gas (l/min) | Absorption rate (%) |
|---|---|---|---|---|---|---|---|
|  | 0.0 | 164 | 9.33 | 1.22 | 0.48 | 1.11 | 95.3 |

EXAMPLE 9-continued

Absorption and separation of 1.2-di-chloroethane (EDC) by dibutyl phthalate/refined mineral oil system

| | | | | | | | |
|---|---|---|---|---|---|---|---|
| Dibutyl phthalate | 1.5 | 160 | 9.33 | 1.22 | 0.93 | 1.12 | 90.9 |
| | 3.0 | 164 | 9.33 | 1.23 | 1.60 | 1.13 | 84.2 |
| Dibutyl phthalate 50vol% | 0.0 | 150 | 9.33 | 1.26 | 0.66 | 1.15 | 93.5 |
| Refined mineral oil 50vol% | 1.5 | 148 | 9.33 | 1.21 | 1.04 | 1.11 | 89.8 |
| | 3.0 | 148 | 9.33 | 1.23 | 1.74 | 1.13 | 82.8 |
| | 0.0 | 136 | 9.33 | 1.22 | 0.96 | 1.12 | 90.6 |
| Refined mineral oil | 1.5 | 136 | 9.33 | 1.24 | 1.38 | 1.14 | 86.4 |
| | 3.0 | 136 | 9.33 | 1.22 | 2.04 | 1.13 | 79.8 |

SEPARATION — pressure 20mmHg, temperature 50° C, time 4 min.

| | EDC content in absorption liquid (wt.%) | Separated EDC vs absorption liquid (wt.%) | Separation rate (%) |
|---|---|---|---|
| | 3 | 0.47 | 15.7 |
| Dibutyl phthalate | 4 | 1.04 | 26.0 |
| | 5 | 1.72 | 34.4 |
| Dibutyl phthalate 50vol% Refined mineral oil 50vol% | 3 | 0.69 | 23.0 |
| | 4 | 1.25 | 31.3 |
| | 5 | 2.02 | 40.4 |
| | 3 | 0.78 | 26.0 |
| Refined mineral oil | 4 | 1.33 | 33.3 |
| | 5 | 2.15 | 43.0 |

What we claim is:

1. A method of purifying a gaseous mixture containing air and vapors of volatile organic materials selected from the group consisting of low boiling petroleum products (e.g. gasoline, naphtha and jet fuel), low boiling liquid products (e.g. aliphatics, naphthenics and aromatics), and also low boiling liquid alcohols, aldehydes, ketones, and chlorine-containing organic materials which comprises contacting said gaseous mixture with an absorption liquid prepared by blending a refined mineral oil with at least one compound selected from the group consisting of methyl ethyl phthalate, diethyl phthalate, dioctyl phthalate, didecyl phthalate, dibutyl phthalate, dimethyl phthalate, dilauryl phthalate, decyl isooctyl phthalate, butyl benzyl phthalate and butyl lauryl phthalate; tetraoctyl silicate and tetranonyl silicate; trioctyl phosphate, tricresyl phosphate, tributyl phosphate, tributoxyethyl phosphate, trixylenyl phosphate, tricresyl diphenyl phosphate, and octyl diphenyl phosphate; dioctyl adipate, dibutyl adipate, dioctyl azelate, dibutyl sebacate, dioctyl sebacate, and butyl oleate; n-dodecyl benzene and isododecyl benzene; α-olefin oligomers having an average molecular weight of 300 to 400 and a kinematic viscosity of 10 to 20 cSt, at 37.8° C,
said mineral oil having an average molecular weight of 200 to 350, a kinematic viscosity of 5 to 20 cSt at 37.8° C, and boiling range of 250° C to 450° C under normal pressure, and absorbing said volatile organic materials therefrom into said absorption liquid.

2. The method according to claim 1, wherein the content of said refined mineral oil in the absorption liquid is within the range of 0.1 to 75% by weight.

3. The method according to claim 1, wherein the contact ratio of said absorption liquid and said gaseous mixture in the absorption tower is in the range of 5 to 300 (Kgs absorption liquid/m$^3$ gas).

* * * * *

UNITED STATES PATENT AND TRADEMARK OFFICE
CERTIFICATE OF CORRECTION

PATENT NO. : 4,102,983
DATED : July 25, 1978
INVENTOR(S) : Osamu YAMASE, et al

It is certified that error appears in the above-identified patent and that said Letters Patent are hereby corrected as shown below:

Column 2, line 12, change "matic of 10 to 20 cSt" to
-- matic viscosity of 10 to 20 cSt --.

Column 2, line 55, after "pipe 2" change "in" to -- is --.

Example 1, "N-C5" should be -- n-C5 --.

Example 7, "( /min)" should be -- ($\ell$/min) --

Example 8, "EXAMPLe 8" should be -- EXAMPLE 8 --.

Example 8, "polyolefin/mineral oil system" should be
-- polyolefin/refined mineral oil system --.

Example 9, "EXAMPLE 8" should be -- EXAMPLE 9 --.

Signed and Sealed this

Thirteenth Day of March 1979

[SEAL]

Attest:

RUTH C. MASON
Attesting Officer

DONALD W. BANNER
Commissioner of Patents and Trademarks